United States Patent
Motegi et al.

(10) Patent No.: US 10,422,265 B2
(45) Date of Patent: Sep. 24, 2019

(54) EXHAUST GAS PURIFYING SYSTEM AND EXHAUST GAS PURIFYING METHOD

(71) Applicant: Komatsu, Ltd., Minato-ku, Tokyo (JP)

(72) Inventors: Nobuaki Motegi, Tokyo (JP); Yuta Okubo, Tokyo (JP); Satoshi Nakazawa, Tokyo (JP); Shinichi Saitou, Tokyo (JP)

(73) Assignee: Komatsu Ltd., Tokyo (JP)

( * ) Notice: Subject to any disclaimer, the term of this patent is extended or adjusted under 35 U.S.C. 154(b) by 107 days.

(21) Appl. No.: 15/511,264

(22) PCT Filed: Dec. 14, 2016

(86) PCT No.: PCT/JP2016/087295
§ 371 (c)(1),
(2) Date: Mar. 15, 2017

(87) PCT Pub. No.: WO2017/073799
PCT Pub. Date: May 4, 2017

(65) Prior Publication Data
US 2018/0163603 A1   Jun. 14, 2018

(51) Int. Cl.
*F01N 9/00* (2006.01)
*F01N 3/023* (2006.01)
(Continued)

(52) U.S. Cl.
CPC ........... *F01N 9/002* (2013.01); *B01D 53/944* (2013.01); *B01D 53/9495* (2013.01);
(Continued)

(58) Field of Classification Search
CPC ........ F01N 3/023; F01N 3/0253; F01N 9/002; F01N 2900/1406; F01N 2900/1411;
(Continued)

(56) References Cited

U.S. PATENT DOCUMENTS 8,762,034 B2 * 6/2014 Oguri ................ B01D 46/0063
60/276
2008/0087101 A1 4/2008 Konstandopoulos
(Continued)

FOREIGN PATENT DOCUMENTS

| CN | 101165324 | 4/2008 |
| CN | 102265008 | 11/2011 |

(Continued)

OTHER PUBLICATIONS

Japan Notice of Allowance in Japanese Application No. 2017-502727, dated Sep. 12, 2017, 1 pages (partial English translation).
(Continued)

*Primary Examiner* — Phutthiwat Wongwian
*Assistant Examiner* — Diem T Tran
(74) *Attorney, Agent, or Firm* — Fish & Richardson P.C.

(57) ABSTRACT

An exhaust gas purifying system includes a differential pressure detector that detects a differential pressure between an inlet/outlet of a filter, a flow rate detector that detects a flow rate of exhaust gas in the filter, a differential based-deposition-amount calculator that calculates a differential-based deposition amount of particulate matters in the filter based on detection results of the differential pressure detector and the flow rate detector, a regeneration temperature setting unit that sets a regeneration processing temperature of the filter based on the calculated differential-based deposition amount, and a regeneration processing unit that performs a regeneration processing of the filter based on the set regeneration processing temperature. The regeneration temperature setting unit sets a first regeneration processing temperature at a start of the regeneration processing and a second regeneration processing temperature higher than the first regeneration processing temperature when the differen-
(Continued)

tial-based deposition amount falls at or below a predetermined threshold.

8 Claims, 14 Drawing Sheets

(51) Int. Cl.
  *B01D 53/94* (2006.01)
  *B01D 53/96* (2006.01)
  *B01D 46/00* (2006.01)
  *F01N 3/025* (2006.01)
(52) U.S. Cl.
  CPC ............ *B01D 53/96* (2013.01); *F01N 3/023* (2013.01); *B01D 46/0063* (2013.01); *B01D 2258/012* (2013.01); *F01N 3/0253* (2013.01); *F01N 2550/04* (2013.01); *F01N 2560/06* (2013.01); *F01N 2560/07* (2013.01); *F01N 2560/08* (2013.01); *F01N 2900/1404* (2013.01); *F01N 2900/1406* (2013.01); *F01N 2900/1411* (2013.01); *F01N 2900/1602* (2013.01); *F01N 2900/1606* (2013.01); *Y02T 10/47* (2013.01)
(58) Field of Classification Search
  CPC ..... F01N 2900/1404; F01N 2900/1602; F01N 2900/1606; F01N 2560/06; F01N 2560/07; F01N 2560/08; F01N 2550/04; B01D 53/944; B01D 53/9495; B01D 53/96; B01D 46/0063; B01D 2258/012
  See application file for complete search history.

(56) References Cited

U.S. PATENT DOCUMENTS

| | | |
|---|---|---|
| 2011/0232364 A1 | 9/2011 | Koizumi et al. |
| 2013/0269323 A1 | 10/2013 | Oguri et al. |
| 2015/0267590 A1 | 9/2015 | Sun et al. |

FOREIGN PATENT DOCUMENTS

| | | | |
|---|---|---|---|
| CN | 103261598 | | 8/2013 |
| DE | 102004005321 | * | 8/2005 |
| DE | 112012001284 | | 1/2014 |
| JP | 2004-293413 | | 10/2004 |
| JP | 2005-076462 | | 3/2005 |
| JP | 2006-342735 | | 12/2006 |
| JP | 2010-169052 | | 8/2010 |
| JP | 2012-197705 | | 10/2012 |

OTHER PUBLICATIONS

German Office Action in German Application No. 112016000123.1, dated Dec. 8, 2017, 15 pages (with English translation).
Chinese Office Action in Chinese Application No. 201680002847.0, dated Jan. 28, 2019, 10 pages (with English translation).
International Search Report and Written Opinion in International Application No. PCT/JP2016/087295, dated Feb. 14, 2017, 10 pages [Japanese only].

* cited by examiner

EXHAUST GAS PURIFYING SYSTEM AND EXHAUST GAS PURIFYING METHOD

CROSS-REFERENCE TO RELATED APPLICATIONS

This application claims priority to International Application No. PCT/JP2016/087295 filed on Dec. 14, 2016, the contents of which are incorporated herein in their entirety.

TECHNICAL FIELD

The present invention relates to an exhaust gas purifying system and an exhaust gas purifying method.

BACKGROUND ART

Diesel engine includes a Diesel Particulate Filter (DPF) in an exhaust pipe thereof in order to remove particulate matters (PM) contained in exhaust gas. The DPF is configured to collect PM such as soot in the exhaust gas and discharge PM-reduced exhaust gas to an outside. Increase in the amount of PM collected by the DPF results in deterioration of filter function. Accordingly, a regeneration processing for combusting the collected PM is performed in the DPF.

The regeneration of the DPF includes: a natural regeneration, in which the deposited PM is naturally combusted when the temperature of the exhaust gas is high; and a forced regeneration performed when the PM deposition amount exceeds a predetermined reference value. In the forced regeneration of DPF, operating conditions of an engine is controlled to raise the exhaust temperature and an external dosing in which fuel is injected in an upstream of the DPF or an internal dosing in which the fuel is injected into a cylinder of the engine is performed, thereby forcibly combusting the deposited PM.

Since the PM deposition amount collected by the DPF cannot be actually measured during an operation of the engine, the PM deposition amount is estimated by calculation. Typically, the PM deposition amount is calculated based on a differential pressure detected between an exhaust gas inlet and exhaust gas outlet of DPF. Then, when the PM deposition amount exceeds a predetermined amount, the forced regeneration is performed.

However, as shown in FIG. 14, though collected PM 101 uniformly deposits in cell of the DPF, the PM 101 deposited in the cell is partially peeled off as more amount of the PM 101 is deposited, and peeled PM 102 may sometimes clog the cell. The cell clogging increases the differential pressure in the DPF, and a forced regeneration may be sometimes performed even when the actual PM deposition amount is not at a level requiring the forced regeneration.

In view of the above, Patent Literature 1 discloses that a PM amount deposited in a DPF is estimated using a model in which the PM amount combusted in the DPF is subtracted from the PM amount in the exhaust gas received by the DPF, and the forced regeneration processing is performed using the estimated PM amount deposited in the DPF.

Patent Literature 2 discloses that the forced regeneration processing of a DPF is performed when a reduction rate of the differential pressure in the DPF reaches a predetermined value or more.

CITATION LIST

Patent Literature(s)

Patent Literature 1 JP-2012-197705 A
Patent Literature 2 JP-2005-76462 A

SUMMARY OF THE INVENTION

Problem(s) to be Solved by the Invention

However, since the density of the PM is high at the portion in which the cell is clogged, the forced regeneration without taking any measures may sometimes excessively raise the combustion temperature of the PM and the cell may be melted. The disclosures of Patent Literatures 1 and 2 are not capable of preventing the cell from being melted in the above situation.

An object of the invention is to provide an exhaust gas purifying system and an exhaust gas purifying method capable of preventing a cell from being melted and efficiently combusting particulate matters deposited in a filter.

Means for Solving the Problem(s)

An exhaust gas purifying system according to an aspect of the invention includes: a filter configured to collect particulate matters in exhaust gas from an engine;
a differential pressure detector configured to detect a differential pressure between an inlet and outlet of the filter;
a flow rate detector configured to detect a flow rate of the exhaust gas flowing in the filter;
a regeneration temperature setting unit configured to set a regeneration processing temperature of the filter based on detection results of the differential pressure detector and the flow rate detector; and
a regeneration processing unit configured to perform a regeneration processing of the filter based on the regeneration processing temperature that is set by the regeneration temperature setting unit.

The regeneration temperature setting unit is configured to set a first regeneration processing temperature at a start of the regeneration processing by the regeneration processing unit and to set a second regeneration processing temperature that is higher than the first regeneration processing temperature when the differential pressure detected by the differential pressure detector falls at or below a predetermined threshold at a predetermined level of the flow rate of the exhaust gas.

According to the above aspect of the invention, the regeneration temperature setting unit sets the regeneration processing temperature at the low first regeneration processing temperature for the filter regeneration processing until the differential pressure detected by the differential pressure detector falls at or below the predetermined threshold at the predetermined exhaust-gas flow rate, and, when the differential pressure falls at or below the predetermined threshold, the regeneration temperature setting unit sets the regeneration processing temperature at the high second regeneration processing temperature for the filter regeneration processing. Accordingly, since the particulate matters in the cell can be combusted at a high temperature after combusting the highly dense particulate matters in the clogged cell at a low temperature, the combustion temperature can be kept from being increased and the melting of the cell in the filter can be avoided. Further, the particulate matters deposited in the filter can be efficiently combusted.

An exhaust gas purifying system according to another aspect of the invention includes: a filter configured to collect particulate matters in exhaust gas from an engine;

a differential pressure detector configured to detect a differential pressure between an inlet and outlet of the filter;

a flow rate detector configured to detect a flow rate of the exhaust gas flowing in the filter;

a differential-based-deposition-amount calculator configured to calculate a differential-based deposition amount of the particulate matters deposited in the filter based on detection results of the differential pressure detector and the flow rate detector;

a regeneration temperature setting unit configured to set a regeneration processing temperature of the filter based on the differential-based deposition amount of the particulate matters calculated by the differential-based-deposition-amount calculator; and a regeneration processing unit configured to perform a regeneration processing of the filter based on the regeneration processing temperature that is set by the regeneration temperature setting unit.

The regeneration temperature setting unit is configured to set a first regeneration processing temperature at a start of the regeneration processing by the regeneration processing unit and to set a second regeneration processing temperature that is higher than the first regeneration processing temperature when the differential-based deposition amount of the particulate matters calculated by the differential-based-deposition-amount calculator falls at or below a predetermined threshold.

An exhaust gas purifying system according to still another aspect of the invention includes: a filter configured to collect particulate matters in exhaust gas from an engine;

a differential pressure detector configured to detect a differential pressure between an inlet and outlet of the filter;

a flow rate detector configured to detect a flow rate of the exhaust gas flowing in the filter;

a differential-based-deposition-amount calculator configured to calculate a differential-based deposition amount of the particulate matters deposited in the filter based on detection results of the differential pressure detector and the flow rate detector;

a model-deposition-amount calculator configured to calculate a model deposition amount using a deposition model of the particulate matters when a time change rate of the differential-based deposition amount calculated by the differential-based-deposition-amount calculator is larger than a predetermined value;

a PM-deposition amount calculator configured to calculate a PM-deposition amount based on the differential-based deposition amount calculated by the differential-based-deposition-amount calculator and the model deposition amount calculated by the model-deposition-amount calculator;

a regeneration temperature setting unit configured to set a regeneration processing temperature of the filter based on the differential-based deposition amount of the particulate matters calculated by the differential-based-deposition-amount calculator; and a regeneration processing unit configured to perform a regeneration processing of the filter based on the regeneration processing temperature that is set by the regeneration temperature setting unit.

The regeneration temperature setting unit is configured to set a first regeneration processing temperature at a start of the regeneration processing by the regeneration processing unit and to set a second regeneration processing temperature that is higher than the first regeneration processing temperature when the PM-deposition amount calculated by the PM-deposition amount calculator falls at or below a predetermined threshold.

In the above aspect of the invention, it is preferable that the exhaust gas purifying system further includes: a model-deposition-amount calculator configured to calculate a model deposition amount using a deposition model of the particulate matters when a time change rate of the differential-based deposition amount calculated by the differential-based-deposition-amount calculator is larger than a predetermined value; and a PM-deposition amount calculator configured to calculate a PM-deposition amount based on the differential-based deposition amount calculated by the differential-based-deposition-amount calculator and the model deposition amount calculated by the model-deposition-amount calculator, in which the regeneration temperature setting unit sets the second regeneration processing temperature when the differential-based deposition amount calculated by the differential-based-deposition-amount calculator falls below the PM-deposition amount calculated by the PM-deposition amount calculator.

In the above aspect of the invention, it is preferable that the deposition model used by the model-deposition-amount calculator is a model in which the PM amount combusted in the filter is subtracted from the PM amount in the exhaust gas inputted to the filter, and the PM-deposition amount calculator is configured to multiply the differential-based deposition amount calculated by the differential-based-deposition-amount calculator with a first coefficient to obtain a first deposition amount and multiply the model deposition amount calculated by the model-deposition-amount calculator with a second coefficient to obtain a second deposition amount, a sum of the first and second coefficients being a predetermined value, and to calculate the PM-deposition amount as a sum of the first deposition amount and the second deposition amount.

In the above aspect of the invention, it is preferable that the regeneration temperature setting unit is configured to change the regeneration processing temperature from the first regeneration processing temperature to the second regeneration processing temperature over a predetermined time.

An exhaust gas purifying method according to a further aspect of the invention includes:

detecting a differential pressure between an inlet and an outlet of a filter that is configured to collect particulate matters in exhaust gas from an engine;

detecting a flow rate of the exhaust gas flowing in the filter; and based on the detected differential pressure and the flow rate, performing a regeneration processing of the filter at a first regeneration processing temperature at a start of the regeneration processing and at a second regeneration processing temperature that is higher than the first regeneration processing temperature when the differential pressure detected by the differential pressure detector falls at or below a predetermined threshold at a predetermined level of the flow rate of the exhaust gas.

BRIEF DESCRIPTION OF DRAWING(S)

FIG. 1 schematically shows an outline of a diesel engine having an exhaust gas purifying system according to an exemplary embodiment of the invention.

DESCRIPTION OF EMBODIMENT(S)

1. Entire Arrangement of Diesel Engine 1

Figure 1:
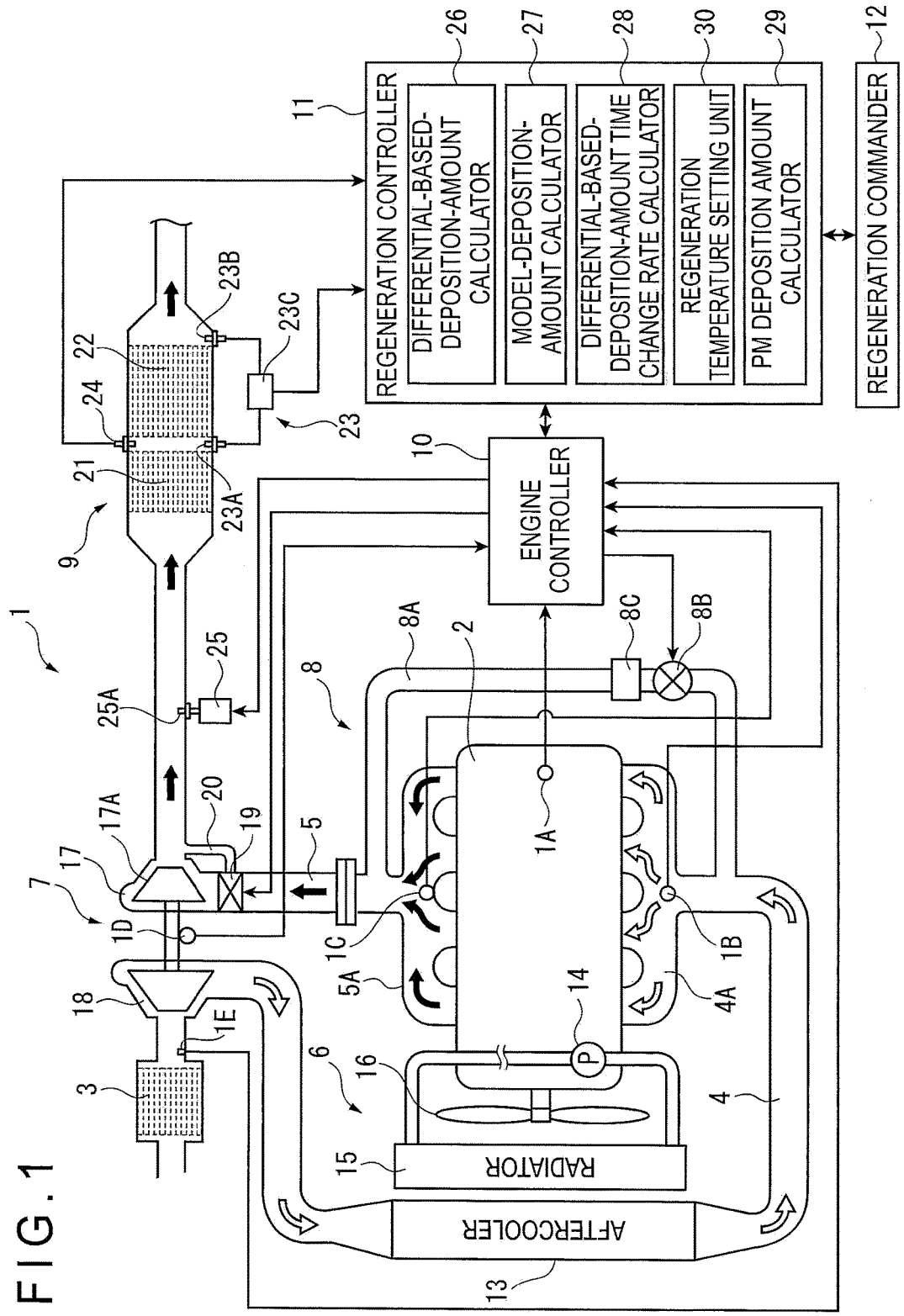

FIG. 1 schematically shows an outline of a diesel engine 1 having an exhaust purifying device 9 according to an exemplary embodiment of the invention. As shown in FIG. 1, the diesel engine 1 includes: an engine body 2 provided with a plurality of combustion chambers therein; an air cleaner 3 configured to filtrate intake air using a filter to prevent foreign substances (e.g. dust) from entering the combustion chambers; a supply air pipe 4 configured to supply air to each of the combustion chambers in the engine body 2; an exhaust pipe 5 configured to discharge exhaust gas discharged from each of the combustion chambers in the engine body 2; a cooling system 6; a turbocharger 7; an exhaust-gas-recirculation system 8; an exhaust gas purifying device 9; an engine controller 10; a regeneration controller 11 and a regeneration commander 12.

A supply air manifold 4A is attached between the engine body 2 and the supply air pipe 4 so that the supply air from the supply air pipe 4 is distributed to each of the combustion chambers in the engine body 2. An exhaust manifold 5A is attached between the engine body 2 and the exhaust pipe 5 so that the exhaust gas discharged from each of the combustion chambers in the engine body 2 collectively enters the exhaust pipe 5.

An aftercooler 13 for cooling the air compressed by the turbocharger 7 is provided in the supply air pipe 4. The cooling system 6 includes a pump 14 driven by a crankshaft (not shown) and the like housed in the engine body 2.

The cooling water delivered by the pump 14 cools components that need to be cooled (e.g. the engine body 2, the turbocharger 7, an oil cooler (not shown)) and, subsequently, is air-cooled by a radiator 15 provided in the cooling system 6.

The cooling function of the aftercooler 13 and the radiator 15 is promoted by a fan 16 provided to the engine body 2 and rotated by a crankshaft (not shown) and the like.

The turbocharger 7 includes: a turbine 17 provided in the exhaust pipe 5; a compressor 18 provided in the supply air pipe 4, connected with the turbine 17 and driven by the turbine 17; and a variable geometry nozzle 19 configured to control a flow rate of the exhaust gas supplied to the turbine 17.

The turbocharger 7 controls the rotation speed of the turbine 17 by controlling an open degree of the variable geometry nozzle 19. The rotation of the turbine 17 actuates the compressor 18, whereby the supply air to the engine body 2 is supercharged. It should be noted that the variable geometry nozzle 19 is configured to deliver the exhaust gas to the exhaust gas purifying device 9 through a bypass 20 when the variable geometry nozzle 19 is fully closed.

Specifically, the exhaust gas is supplied to a turbine disc 17A when the variable geometry nozzle 19 is opened, whereas the exhaust gas is outputted to the exhaust gas purifying device 9 through the bypass 20 when the variable geometry nozzle 19 is fully closed so that a workload on the turbine disc 17A is lessened and an exhaust temperature is increased.

The exhaust-gas-recirculation system 8 includes an exhaust gas recirculation line 8A intercommunicating the exhaust manifold 5A and the supply air pipe 4. A part of the exhaust gas is extracted from the exhaust manifold 5A to be recirculated through the exhaust gas recirculation line 8A to the supply air pipe 4. An Exhaust Gas Recirculation (EGR) valve 8B for opening/closing the exhaust gas recirculation line 8A and an EGR cooler 8C for cooling the exhaust gas from the exhaust manifold 5A are provided in the exhaust gas recirculation line 8A. The exhaust-gas-recirculation system 8 flows the part of the exhaust gas through the exhaust gas recirculation line 8A back to the supply air manifold 4A to reduce an oxygen concentration in the supply air and lower a combustion temperature in the engine body 2. Thus, the amount of nitrogen oxides contained in the exhaust gas can be reduced.

2 Structure of Exhaust Gas Purifying Device 9

The exhaust gas purifying device 9 (exhaust gas purifying system) is disposed downstream of the turbine 17 and is configured to remove the PM contained in the exhaust gas. The exhaust gas purifying device 9 includes a diesel oxidation catalyst (DOC) 21, a DPF 22, a differential pressure sensor 23, and a temperature sensor 24.

The DOC 21 and the DPF 22 are provided in a cylindrical exhaust pipe. The DOC 21 is provided on an upstream side of the exhaust pipe and the DPF 22 is provided on a downstream side of the exhaust pipe.

Further, a dosing nozzle 25A configured to inject a dosing fuel supplied by a dosing fuel supplier 25 is disposed between the turbine 17 and the exhaust gas purifying device 9. The dosing fuel is injected when a forced regeneration is commanded.

The DOC 21 includes Pt (platinum) and the like. The DOC 21 is configured to oxidize and remove CO (carbon monoxide) and HC (hydrocarbon) contained in the exhaust gas and Soluble Organic Fraction (SOF) contained in the PM. Further, the DOC 21 is configured to oxidize NO (nitrogen monoxide) contained in the exhaust gas to turn the NO into $NO_2$ (nitrogen dioxide). In addition, the DOC 21 is configured to oxidize the dosing fuel injected from the dosing nozzle 25A to raise the exhaust-gas temperature.

The DPF 22 is configured to collect the PM. The DPF 22 includes a base material of silicon carbide and the like.

The PM contained in the exhaust gas passes through the minute pores formed in the DPF 22 to be collected in the DPF 22. As shown in FIG. 1, the DPF 22 includes cell densely arranged in the cylindrical exhaust pipe and having minute flow paths extending along a flow direction of the exhaust gas. The DPF 22 of the exemplary embodiment is a so-called wall-flow DPF having alternately arranged cells whose upstream ends are sealed and cells whose downstream ends are sealed.

The collected PM is oxidized (combusted) by oxygen contained in the exhaust gas and $NO_2$ generated by the DOC 21 with a proviso that the temperature of the exhaust gas is sufficient to proceed an oxidation reaction.

The differential pressure sensor 23 includes: a pressure sensor 23A disposed upstream of the DPF 22 and configured to detect a pressure at the upstream of the DPF 22; a pressure sensor 23B disposed downstream of the DPF 22 to detect a pressure at the downstream of the DPF 22; and a differential pressure detector 23C that is configured to output to the regeneration controller 11 a differential pressure obtained by subtracting the pressure detected by the pressure sensor 23B from the pressure detected by the pressure sensor 23A.

The temperature sensor 24 is disposed upstream of the DPF 22 and is configured to detect an exhaust temperature at an inlet of the DPF 22 and output the exhaust temperature as a DPF temperature to the regeneration controller 11.

3. Structure of Engine Controller 10

The engine controller 10 is configured to control the fuel injection quantity, the fuel injection timing, the EGR valve 8B and the variable geometry nozzle 19 according to the input value of the input unit (e.g. accelerator pedal (not shown)) based on a request by an operator, thereby controlling an engine speed and torque.

The diesel engine 1 includes an engine speed sensor 1A, a boost pressure sensor 1B, an exhaust pressure sensor 1C, a turbine speed sensor 1D, and a flow rate sensor 1E, the outputs of the sensors being inputted to the engine controller 10.

The engine speed sensor 1A is configured to detect a rotation speed of the crankshaft (not shown) of the engine body 2 and output a signal indicating the rotation speed of the crankshaft to the engine controller 10.

The boost pressure sensor 1B is configured to detect a boost pressure (i.e. pressure in a section between an outlet path of the compressor 18 and the supply air manifold 4A) and to output the boost pressure to the engine controller 10.

The exhaust pressure sensor 1C is configured to detect an exhaust pressure (i.e. pressure in a section between the exhaust manifold 5A and an inlet path of the turbine 17) and to output the exhaust pressure to the engine controller 10.

The turbine speed sensor 1D is configured to detect a rotation speed of the turbine 17 and to output the rotation speed of the turbine 17 to the engine controller 10.

The flow rate sensor 1E is configured to detect a flow rate of the air supplied from the air cleaner 3 and to output the flow rate of the air supplied from the air cleaner 3 to the engine controller 10.

Based on a command from the regeneration controller 11, the engine controller 10 (regeneration processing unit) is configured to: control the fuel injection quantity, the fuel injection timing, the EGR valve 8B and the variable geometry nozzle 19 to raise the exhaust temperature; and to control a forced regeneration by injecting the dosing fuel from the dosing nozzle 25A. It should be especially noted that, when the forced regeneration is performed, the engine controller 10 reduces the fuel injection quantity and closes each of the EGR valve 8B and the variable geometry nozzle 19 to raise the exhaust temperature.

4. Structure of Regeneration Controller 11

The regeneration controller 11 is configured to estimate a PM deposition amount PMs deposited in the DPF 22 based on exhaust-gas flow rate information, PM generation amount information and PM combustion amount information obtained from the engine controller 10, the differential pressure detected by the differential pressure sensor 23, and the DPF temperature detected by the temperature sensor 24. The regeneration controller 11 is also configured to notify the regeneration commander 12 when the PM deposition amount PMs exceeds a predetermined threshold PMth. Further, the regeneration controller 11 is configured to instruct the engine controller 10 to perform the manual forced regeneration upon receipt of a manual regeneration command from the regeneration commander 12. The regeneration controller 11 is configured to report a completion of the manual forced regeneration to the regeneration commander 12 when the manual forced regeneration is completed.

The regeneration commander 12 is provided to a display panel that is provided near an operator seat and is configured to receive an input/output operation thereon. The regeneration commander 12 is configured to display an alert prompting a manual regeneration command upon receipt of a notification from the regeneration controller 11 and to output the manual regeneration command to the regeneration controller 11 when receiving an operation instructing the manual regeneration command. Further, the regeneration commander 12 is configured to display a completion of the manual forced regeneration when receiving a completion report of the manual forced regeneration.

Figure 2:
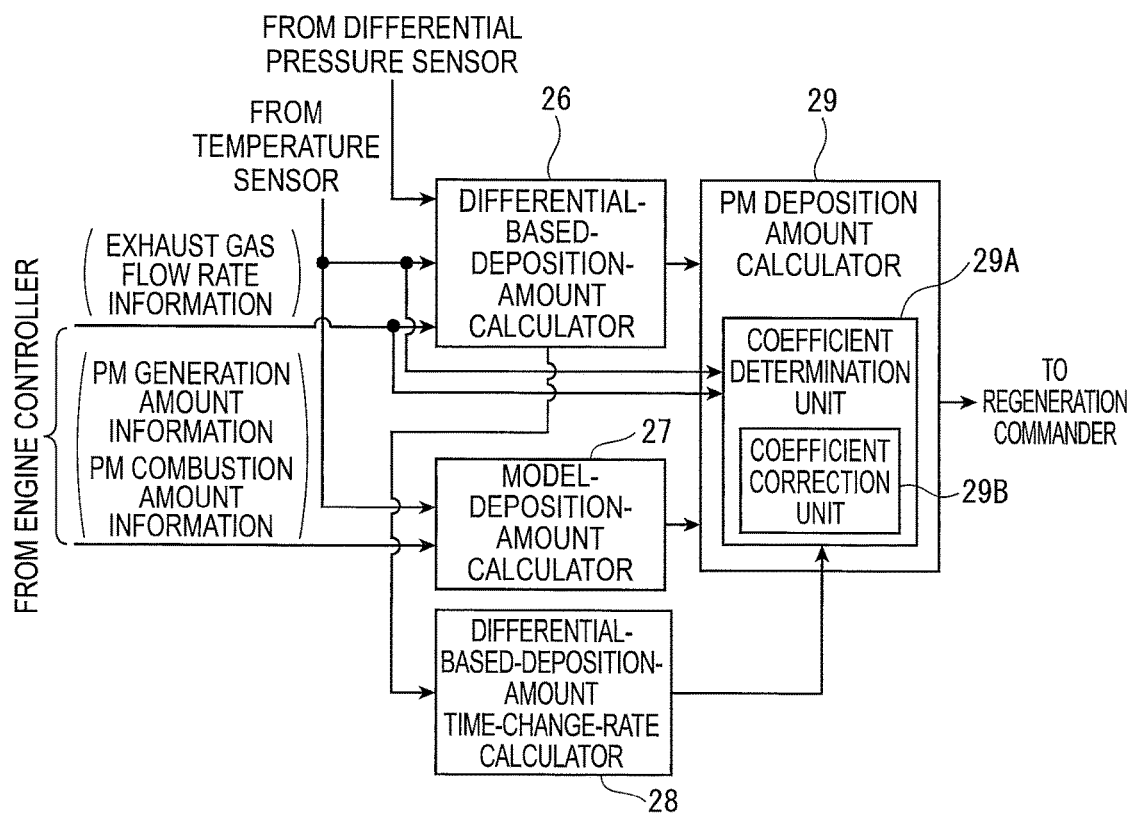
FIG. 2 is a block diagram showing an arrangement of a regeneration controller according to the exemplary embodiment.

As shown in FIGS. 1 and 2, the regeneration controller 11 includes a differential-based-deposition-amount calculator 26, a model-deposition-amount calculator 27, a differential-based-deposition-amount time-change-rate calculator 28, a PM deposition amount calculator (PM-deposition amount calculator) 29, and a regeneration temperature setting unit 30.

The differential-based-deposition-amount calculator 26 is configured to receive the differential pressure of the DPF 22 from the differential pressure sensor 23, the DPF temperature from the temperature sensor 24, and the exhaust-gas flow rate information from the engine controller 10. The exhaust-gas flow rate information indicates an exhaust gas volume flow rate inputted to the DPF 22.

The engine controller 10 (a flow rate detector) is configured to output a mass flow rate as a sum of (i) a supply air mass flow rate detected by the flow rate sensor 1E and (ii) an exhaust-gas mass flow rate estimated based on a fuel injection quantity detected by a fuel injection quantity sensor (not shown in FIG. 1) to the differential-based-deposition-amount calculator 26. The differential-based-deposition-amount calculator 26 is configured to convert the mass flow rate of the exhaust gas to an exhaust gas volume flow rate based on the DPF temperature outputted by the temperature sensor 24.

Figure 3:
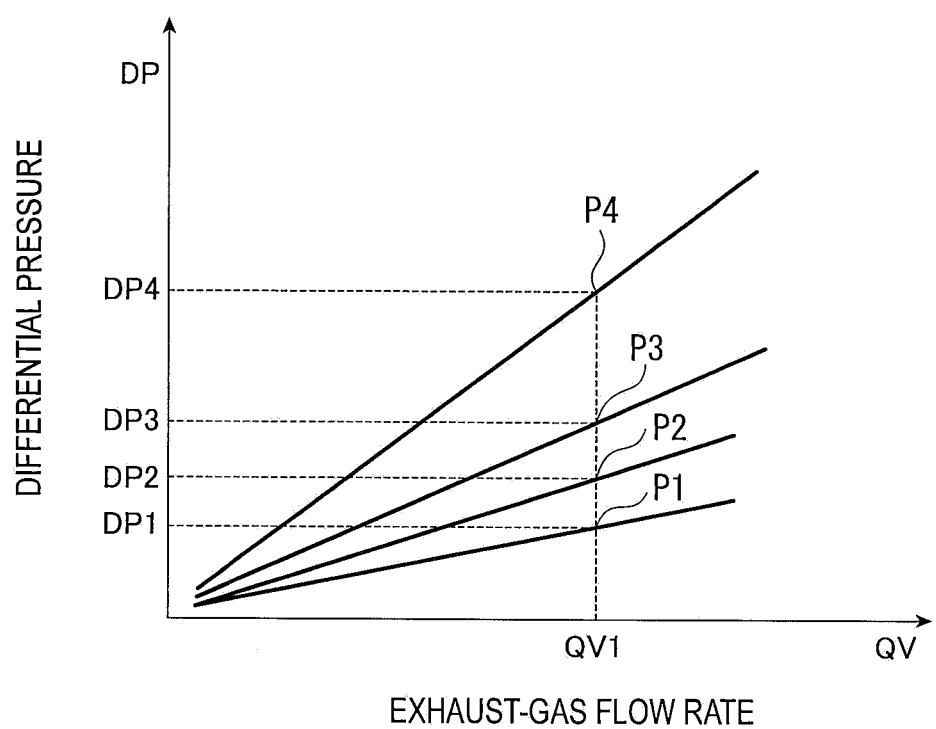
FIG. 3 is a graph showing a relationship between an exhaust-gas flow rate and a differential pressure with a PM deposition amount being used as a parameter.

The differential-based-deposition-amount calculator 26 includes a three-dimensional map representing a relationship between the converted exhaust-gas flow rate QV, the differential pressure DP and the PM deposition amount, and is configured to output the PM deposition amount as a function of the detection results (i.e. the converted exhaust-gas flow rate and the differential pressure). Specifically, as shown in FIG. 3, the three-dimensional map stores the relationship between the exhaust-gas flow rate QV and the differential pressure DP with the PM deposition amount as a parameter. When the exhaust-gas flow rate QV is constant, the PM deposition amount increases in accordance with an increase in the differential pressure DP. On the other hand, when the differential pressure DP is constant, the PM deposition amount decreases in accordance with an increase in the exhaust-gas flow rate QV. For instance, as shown in FIG. 3, when the exhaust-gas flow rate is QV1 and the differential pressure is DP1, DP2, DP3 or DP4, the PM deposition amount becomes P1, P2, P3 or P4 respectively, where the PM deposition amount P4 is larger than the PM deposition amount P1. Then, the differential-based-deposition-amount calculator 26 outputs the estimated PM deposition amount as a differential-based deposition amount PMa to the PM deposition amount calculator 29 and the differential-based-deposition-amount time-change-rate calculator 28.

Figure 4:
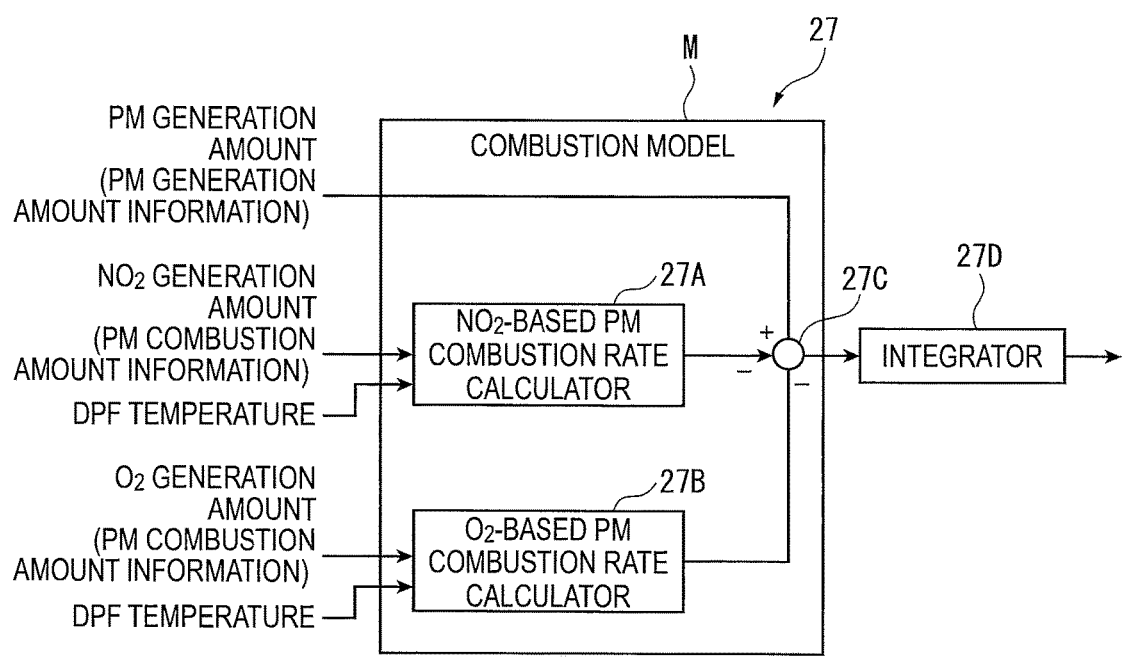
FIG. 4 is a block diagram showing an arrangement of a model-deposition-amount calculator according to the exemplary embodiment.

As shown in FIG. 4, the model-deposition-amount calculator 27 receives the PM generation amount information and the PM combustion amount information from the engine controller 10 and the DPF temperature from the temperature sensor 24. The engine controller 10 outputs to the model-deposition-amount calculator 27 the PM generation amount information indicating the PM generation amount in the exhaust gas estimated based on the fuel injection quantity, air-fuel ratio and the like, and the PM combustion amount information indicating estimated $NO_2$ generation amount presumably outputted from the DOC 21 and $O_2$ generation amount outputted from the DOC 21.

The model-deposition-amount calculator 27 uses a deposition model M in which the PM deposition amount is estimated by subtracting the PM combustion amount (PM amount combusted by the DPF 22) from the PM generation amount (PM amount generated by the diesel engine 1 and inputted to the DPF 22). It should be noted that the deposition model M calculates a PM deposition rate.

An $NO_2$-based PM combustion rate calculator 27A calculates the $NO_2$-based PM combustion rate based on the $NO_2$ generation amount outputted by the engine controller 10 and the DPF temperature using a map or the like storing a reaction rate for oxidizing (combusting) the PM deposited in the DPF 22 using $NO_2$, which is obtained in advance through an actual measurement or the like.

Am $O_2$-based PM combustion rate calculator 27B calculates the $O_2$-based PM combustion rate based on the $O_2$ generation amount outputted by the engine controller 10 and the DPF temperature using a map or the like storing a reaction rate for oxidizing (combusting) the PM deposited in the DPF 22 using $O_2$, which is obtained in advance through an actual measurement or the like.

The PM generation amount outputted by the engine controller 10 represents the PM generation rate. A calculator 27C calculates the PM deposition rate by subtracting the $NO_2$-based PM combustion rate and the $O_2$-based PM combustion rate from the PM generation rate and outputs the PM deposition rate to an integrator 27D. The integrator 27D integrates the PM deposition amount based on the inputted PM deposition rate and outputs the integrated PM deposition amount as a model deposition amount PMb to the PM deposition amount calculator 29.

Referring back to FIG. 2, the PM deposition amount calculator 29 (PM-deposition amount calculator) calculates the PM deposition amount (particulate matter deposition amount) PMs by multiplying a weight coefficient to a sum of the differential-based deposition amount PMa inputted from the differential-based-deposition-amount calculator 26 and the model deposition amount PMb inputted from the model-deposition-amount calculator 27. The PM deposition amount PMs is represented by the following formula (1) in which a denotes a first coefficient ($0 \le \alpha \le 1$).

$$PMs = \alpha \cdot PMa + (1-\alpha) \cdot PMb \qquad (1)$$

Specifically, a sum of: the differential-based deposition amount PMa multiplied by the first coefficient α (weight coefficient); and the model deposition amount PMb multiplied by a second coefficient (1−α) (weight coefficient) is defined to be a constant value "1." In other words, the first coefficient α defines a distribution ratio of the differential-based deposition amount PMa and the model deposition amount PMb. When the first coefficient α is 1, the PM deposition amount PMs is equal to the value of the differential-based deposition amount PMa. When the first coefficient α is 0, the PM deposition amount PMs is equal to the value of the model deposition amount PMb.

Further, the PM deposition amount calculator 29 includes a coefficient determination unit 29A that is configured to determine the first coefficient α. The exhaust-gas flow rate information from the engine controller 10 and the DPF temperature from the temperature sensor 24 are inputted to the coefficient determination unit 29A, where the exhaust-gas flow rate in the DPF 22 converted by the DPF temperature is calculated. When the value of the converted exhaust-gas flow rate exceeds a predetermined threshold QVth, the coefficient determination unit 29A sets the first coefficient α at 1. When the value of the converted exhaust-gas flow rate is less than the predetermined threshold QVth, the coefficient determination unit 29A sets the first coefficient α at 0.

The differential-based-deposition-amount time-change-rate calculator 28 is configured to calculate a differential-based-deposition-amount time change rate ΔPMa (a time change rate of the differential-based deposition amount PMa inputted from the differential-based-deposition-amount calculator 26) and output the differential-based-deposition-amount time change rate ΔPMa to the coefficient correction unit 29B in the coefficient determination unit 29A. The coefficient determination unit 29A is configured to adjust the first coefficient α at α', which is smaller than 1, when the differential-based-deposition-amount time change rate ΔPMa exceeds the threshold ΔPMath.

The regeneration temperature setting unit 30 shown in FIG. 1 is configured to change based on a predetermined condition a first regeneration processing temperature at the start of the regeneration by the DPF 22 to a second regeneration processing temperature, which is higher than the first regeneration processing temperature.

Specifically, the regeneration temperature setting unit 30 is configured to detect a combustion temperature raised by the dosing fuel injected from the dosing nozzle 25A with the temperature sensor 24, to judge whether the detected temperature reaches a target temperature and adjusts the fuel injection quantity from the dosing nozzle 25A.

Figure 5:
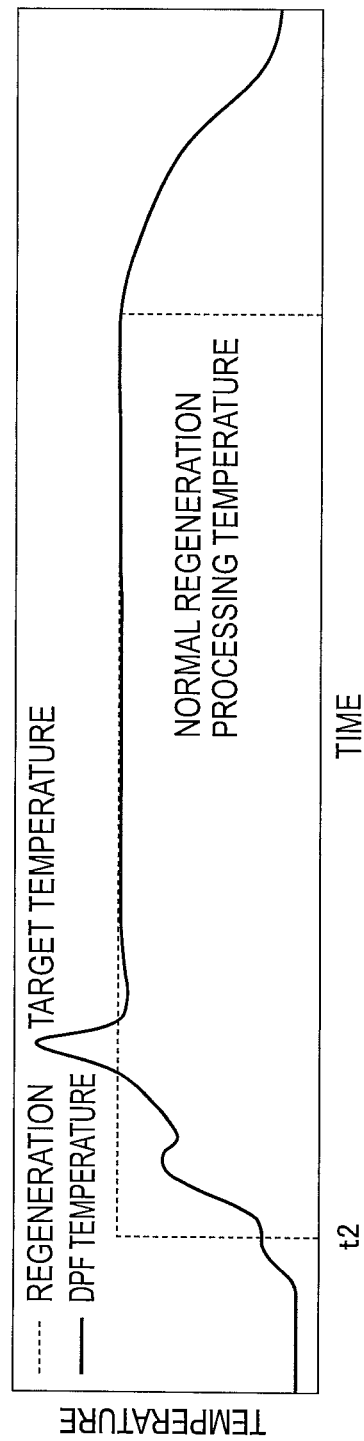
FIG. 5 is a graph showing a relationship between a target temperature and a temperature of the DPF in a typical regeneration processing.

As shown in FIG. 5, since the density of PM is high at the portion at which the PM deposited in the DPF 22 is peeled off to clog the cell, an actual combustion temperature during a the regeneration processing started at a time point t2 at a normal regeneration processing temperature becomes higher than the target value for the normal regeneration processing temperature in accordance with the progress in the combustion of the PM. The increase in the combustion temperature in the DPF 22 results in melting of the cell of the DPF 22, and, consequently, damages the DPF 22.

Figure 6:
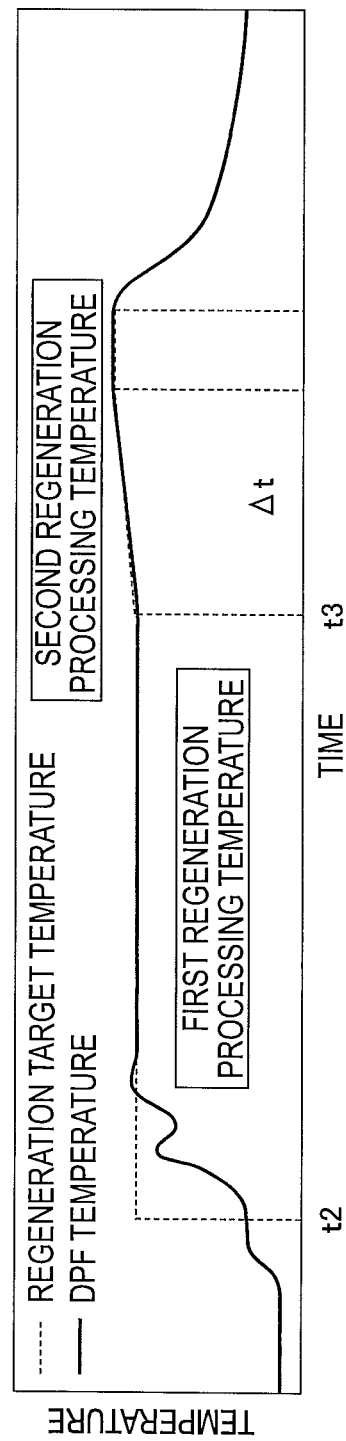
FIG. 6 is a graph showing a relationship between the target temperature and the temperature of the DPF in the regeneration processing according to the exemplary embodiment.

Accordingly, as shown in FIG. 6, the regeneration temperature setting unit 30 is configured to start the regeneration processing of the DPF 22 at the time point t2 at the first regeneration processing temperature that is lower than the normal regeneration processing temperature, and switch the first regeneration processing temperature to the second regeneration processing temperature (i.e. the normal regeneration temperature) at a time point t3 when the predetermined condition is satisfied.

Figure 14:
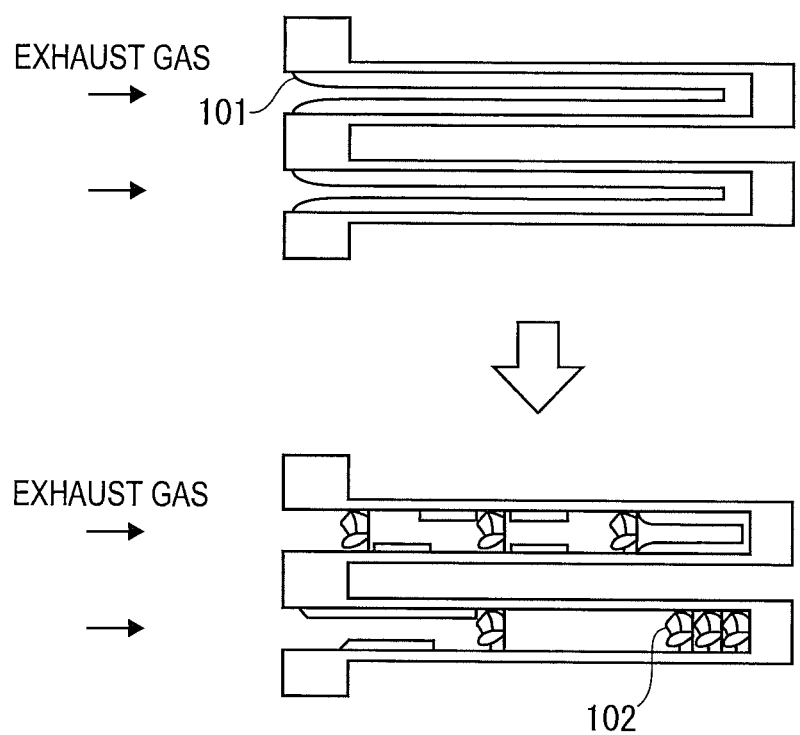
FIG. 14 is a cross section showing the clogged cell of the DPF.

Specifically, the predetermined condition is met when the differential-based deposition amount PMa inputted by the differential-based-deposition-amount calculator 26 falls at or below the predetermined threshold PMth and the differential-based deposition amount PMa becomes less than the PM deposition amount PMs (i.e. the PM-deposition amount calculated by the formula (1)). When the above condition is satisfied, the regeneration temperature setting unit 30 judges that the above-described cell clogging shown in FIG. 14 is eliminated and switches the regeneration processing temperature from the first regeneration processing temperature to the second regeneration processing temperature.

It should be noted that, though the first regeneration processing temperature is changed to the second regeneration processing temperature on condition that the differential-based deposition amount PMa becomes the threshold PMth or less and less than the PM deposition amount PMs, the scope of the invention is not limited to such an arrangement. For instance, the first regeneration processing temperature may be switched to the second regeneration processing temperature when a predetermined condition that the differential pressure detected by the differential pressure detector 23C falls at or below a predetermined threshold is satisfied.

Further, as shown in FIG. 6, the change from the first regeneration processing temperature to the second regeneration processing temperature by the regeneration temperature setting unit 30 is gradually performed over a predetermined time Δt.

As a result, since the regeneration processing temperature can be changed from the first regeneration processing temperature to the second regeneration processing temperature without causing an abrupt temperature change in the DPF 22, the melting of the cell of the DPF 22 can be reliably prevented.

It should also be noted that, though the regeneration processing temperature may be linearly changed from the first regeneration processing temperature to the second regeneration processing temperature as shown in FIG. 6, the regeneration processing temperature may be discretely raised in minute steps.

5. Effects and Advantages of Exemplary Embodiment

Next, an effect of the above-described exhaust gas purifying device 9 (i.e. the exhaust gas purifying method) of the exemplary embodiment will be described below with reference to flowcharts in FIGS. 7 to 9.

Figure 7:
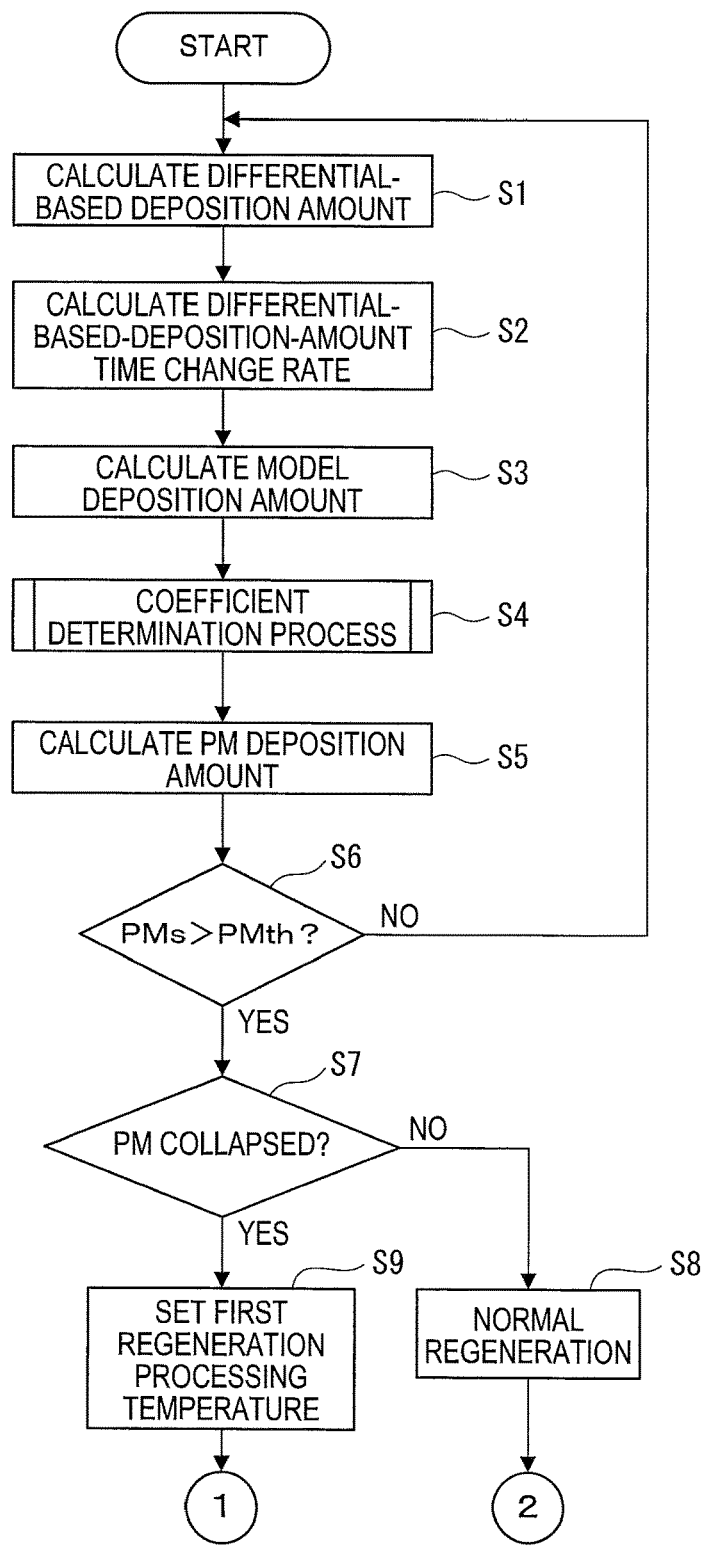
FIG. 7 is a flowchart showing a function of the exemplary embodiment.
Figure 8:
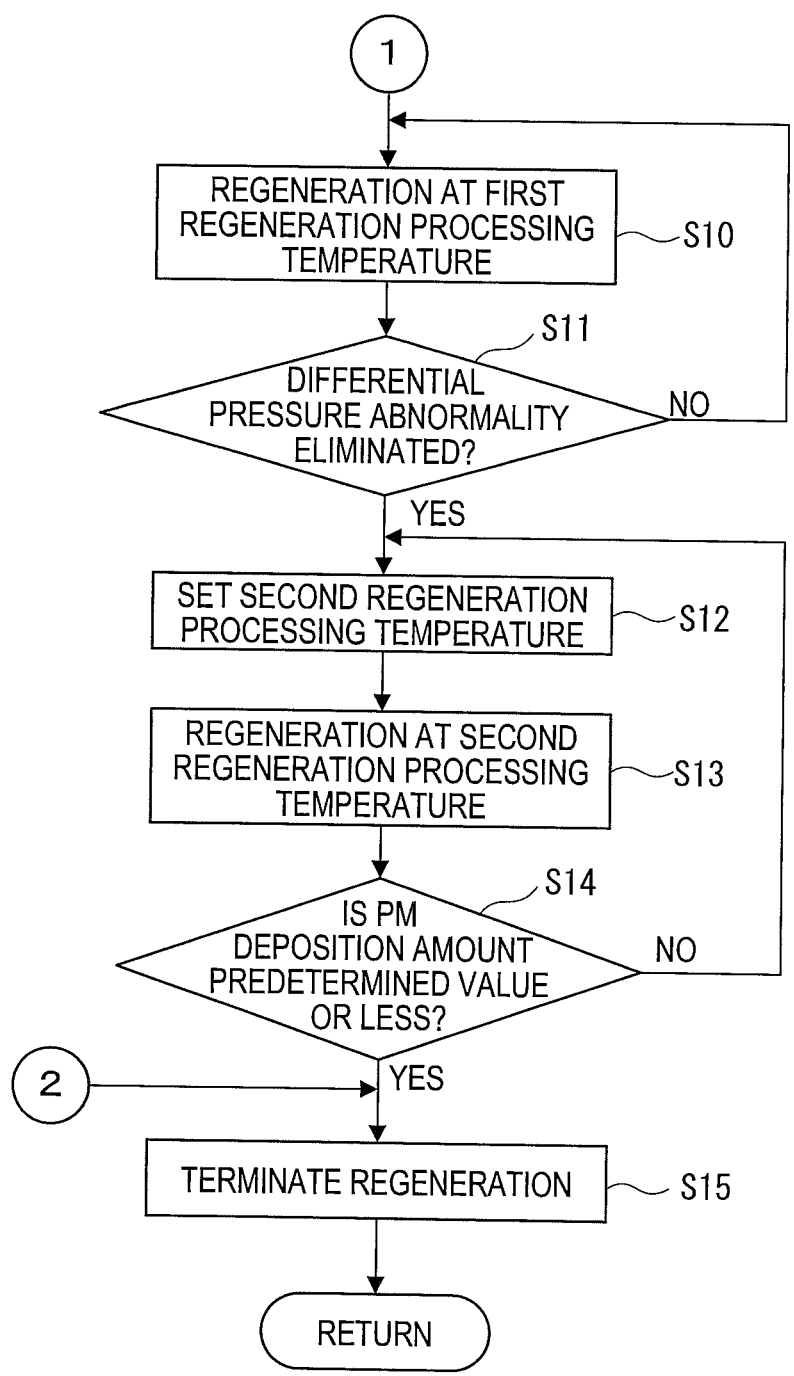
FIG. 8 is another flowchart showing the function of the exemplary embodiment.

Initially, as shown in FIG. 7, the differential-based-deposition-amount calculator 26 calculates the differential-based deposition amount PMa (Step S1). Subsequently, the differential-based-deposition-amount time-change-rate calculator 28 calculates the differential-based-deposition-amount time change rate ΔPMa based on the calculated differential-based deposition amount PMa (Step S2). Further, the model-deposition-amount calculator 27 calculates the model deposition amount PMb (Step S3). It should be noted that the Steps S1 to S3 are not necessarily performed in this order but may be performed in parallel or in a different order.

Next, the coefficient determination unit 29A of the PM deposition amount calculator 29 performs the coefficient determination process (Step S4).

Figure 9:
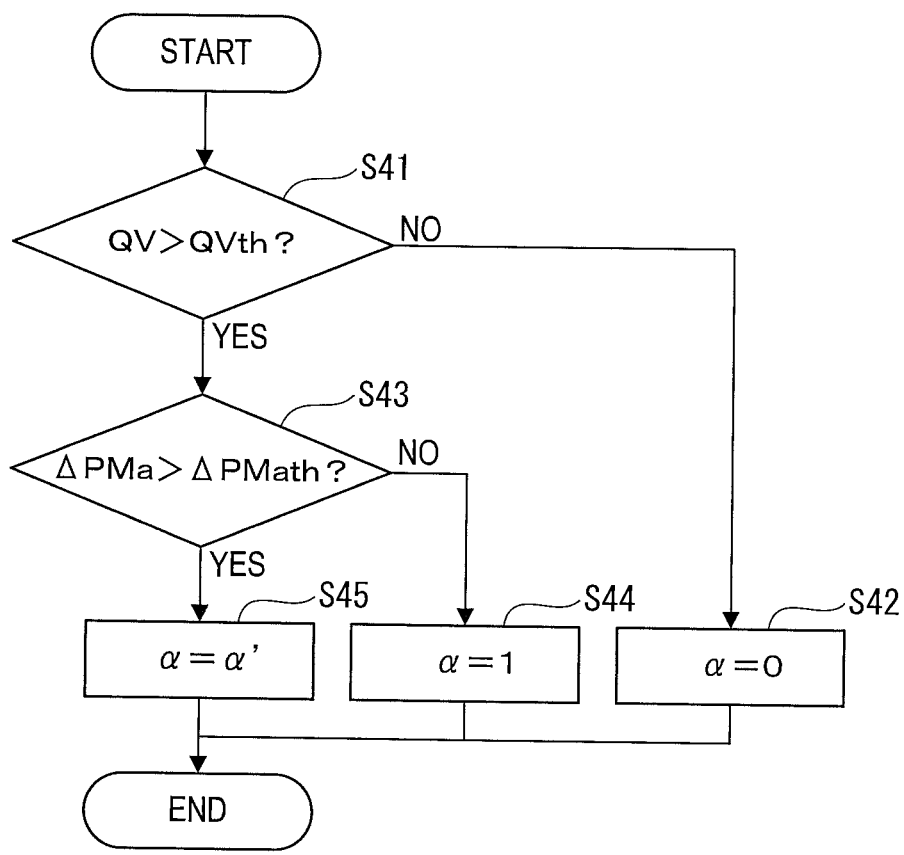
FIG. 9 is still another flowchart showing the function of the exemplary embodiment.

Specifically, as shown in a flowchart in FIG. 9, the coefficient determination unit 29A judges whether or not the exhaust-gas flow rate QV exceeds the threshold QVth (Step S41). When the exhaust-gas flow rate QV does not exceed the threshold QVth (S41: No), the coefficient determination unit 29A sets the first coefficient α at 0 and terminates the coefficient determination process (Step S42).

When the exhaust-gas flow rate QV exceeds the threshold QVth (S41: Yes), the coefficient determination unit 29A judges whether or not the differential-based-deposition-amount time change rate ΔPMa exceeds the predetermined threshold ΔPMath (Step S43). When the differential-based-deposition-amount time change rate ΔPMa does not exceed the predetermined threshold ΔPMath (S43: No), the coefficient determination unit 29A sets the first coefficient α at 1 and terminates the coefficient determination process (Step S44).

On the other hand, when the differential-based-deposition-amount time change rate ΔPMa exceeds the predetermined threshold ΔPMath (S43: Yes), the coefficient correction unit 29B adjusts the first coefficient α to α' and terminates the coefficient determination process (Step S45).

Figure 10:
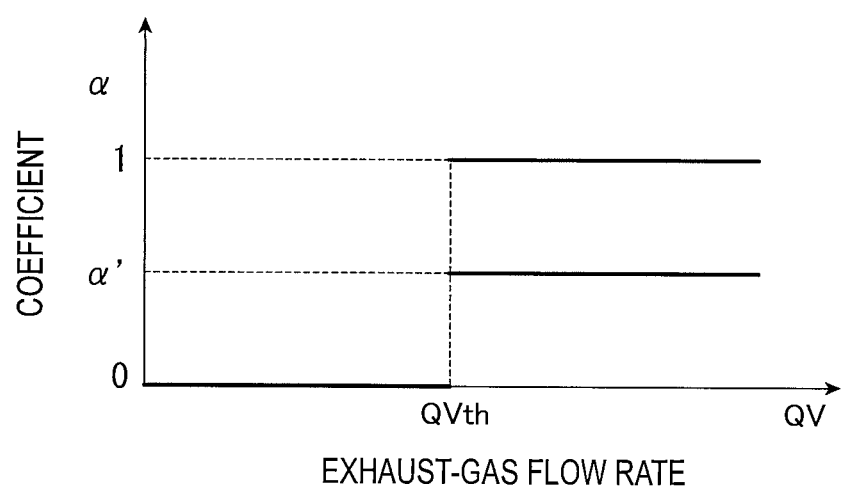
FIG. 10 is a graph showing a dependency of a first coefficient α on an exhaust-gas flow rate in the exemplary embodiment.

Specifically, as shown in a flowchart in FIG. 10, the coefficient determination unit 29A sets the first coefficient α at one of 0, 1 and α' based on a judgment on whether or not the exhaust-gas flow rate QV exceeds the threshold QVth.

Figure 11:
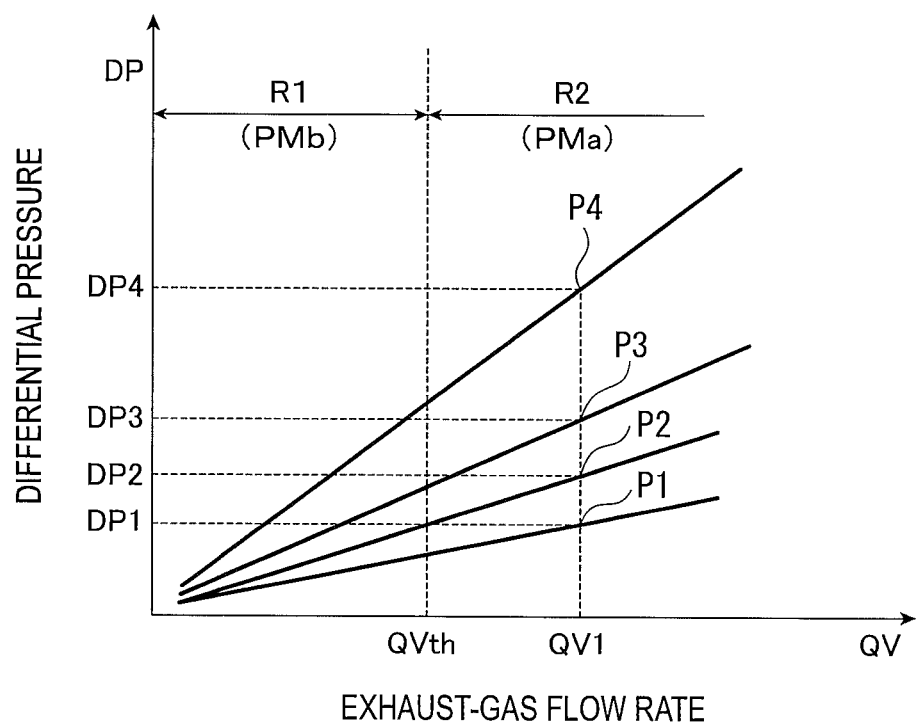
FIG. 11 is a graph showing a range in which a differential-based deposition amount is used and a range in which a model deposition amount is used in the exemplary embodiment.

When the exhaust-gas flow rate QV does not exceed the predetermined threshold QVth, as shown in FIG. 11, the exhaust-gas flow rate QV is in a range R1. In this case, the coefficient determination unit 29A sets the first coefficient α at 0.

The first coefficient α is set at 0 assuming that the PM deposition amount PMs is the model deposition amount PMb in the range R1 because the estimation accuracy for the differential-based deposition amount PMa is low in the range R1.

On the other hand, when the exhaust-gas flow rate QV exceeds the predetermined threshold QVth, as shown in FIG. 11, the exhaust-gas flow rate QV is in a range R2. In this case, the coefficient determination unit 29A sets the first coefficient α at 1 or α'.

In the range R2, it is supposed that the PM in the DPF 22 is deposited to a level requiring the regeneration processing, or a part of the PM in the cell of the DPF 22 is peeled off to cause the cell clogging. When the PM is deposited to the level requiring the regeneration processing, the coefficient determination unit 29A sets the first coefficient α at 1.

Figure 12:
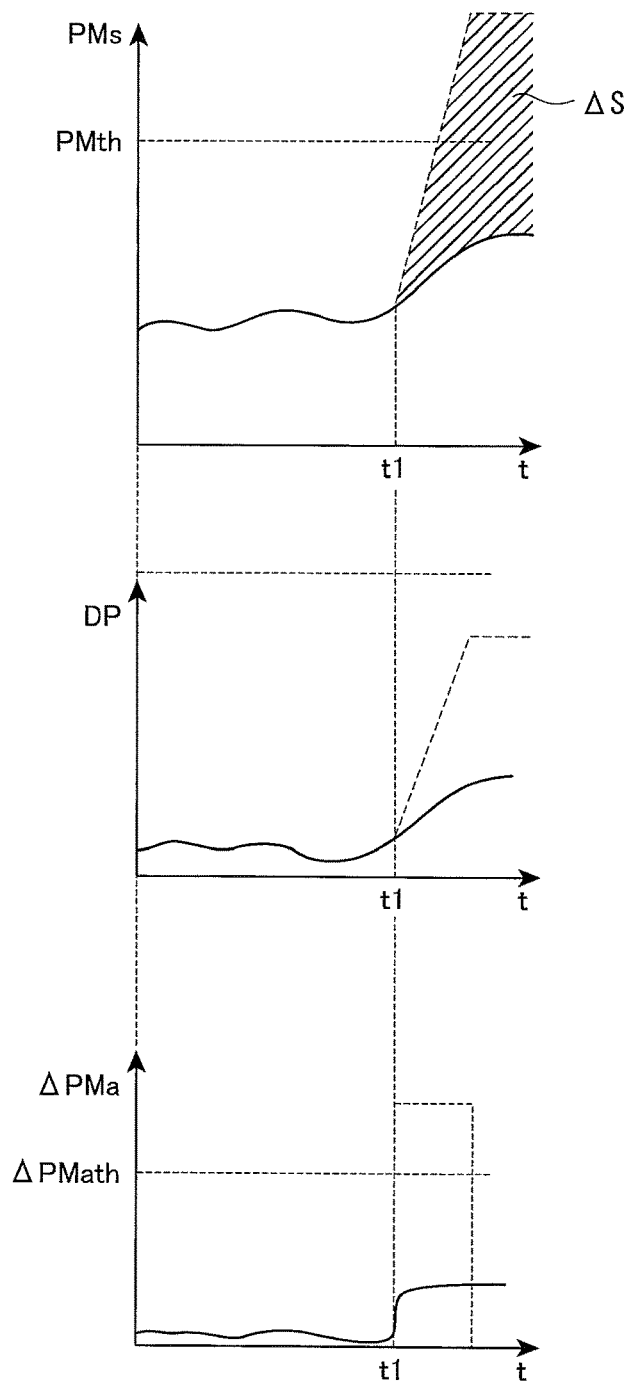
FIG. 12 is a graph showing temporal changes in the differential-based deposition amount, differential pressure, and differential-based-deposition-amount time change rate caused by cell clogging of the DPF in the exemplary embodiment.

In order to determine whether the cell clogging has occurred or not, it is noted as shown in FIG. 12 that the occurrence of the cell clogging at a certain time t1 entails abrupt increase in the differential pressure DP in the DPF 22

(see a graph in the middle of FIG. 12). In accordance therewith, the differential-based deposition amount PMa calculated based on the differential pressure DP also abruptly increases (see the upper graph in FIG. 12), so that a difference ΔS is caused between the actual PM deposition amount shown in a dotted line and the differential-based deposition amount PMa.

When the differential-based deposition amount PMa exceeds the threshold PMth, the regeneration processing is performed even when the actual PM deposition amount does not reach the threshold PMth.

Accordingly, the coefficient correction unit 29B judges whether or not the cell clogging has occurred based on a determination result on whether or not the differential-based-deposition-amount time change rate ΔPMa exceeds the predetermined threshold ΔPMath (see the lower graph in FIG. 12), and adjusts the first coefficient α to the predetermined value α' (0<α'<1). The coefficient determination unit 29A determines that the adjusted value α' as the first coefficient α.

When the coefficient determination process by the coefficient determination unit 29A is terminated, the PM deposition amount calculator 29 substitutes the determined first coefficient α into the above-described formula (1) as shown in FIG. 7 to calculate the PM deposition amount PMs (Step S5).

The PM deposition amount calculator 29 judges whether or not the PM deposition amount PMs has reached the predetermined threshold PMth (Step S6). When it is judged that the PM deposition amount PMs has not reached the predetermined threshold PMth (S6: No), the procedure is returned to and is repeated from Step S1.

When it is judged that the PM deposition amount PMs has reached the predetermined threshold PMth (S7: Yes), the regeneration temperature setting unit 30 judges whether or not the PM in the cell of the DPF 22 are collapsed (Step S7).

The judgment of the occurrence of the PM collapse is performed, in the same manner as that in the coefficient determination process, based on a judgment on whether or not the differential-based deposition amount PMa exceeds the predetermined threshold PMth and the differential-based-deposition-amount time change rate ΔPMa exceeds the predetermined threshold ΔPMath. When it is judged that the PM collapse has not occurred (S7: No), the regeneration temperature setting unit 30 outputs a setting shown in FIG. 5 for performing the normal regeneration processing to the regeneration commander 12 (Step S8).

When it is judged that the PM collapse has occurred (S7: Yes), the regeneration temperature setting unit 30 sets the first regeneration processing temperature (Step S9). As shown in FIG. 8, the regeneration commander 12 commands the engine controller 10 to perform the regeneration processing according to the first regeneration processing temperature (Step S10).

After starting the regeneration processing based on the first regeneration processing temperature, the regeneration temperature setting unit 30 judges whether or not a differential pressure abnormality is eliminated (Step S11).

Figure 13:
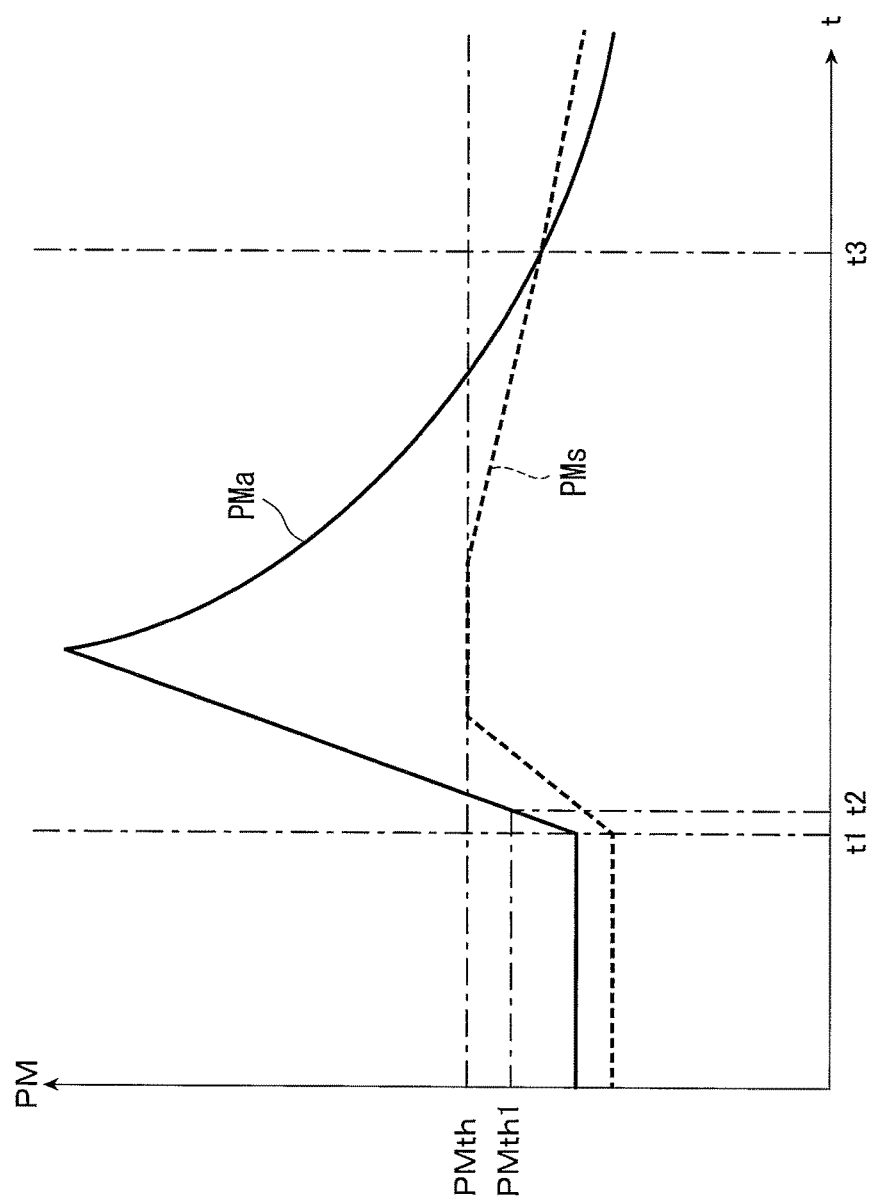
FIG. 13 is a graph showing a change from a first regeneration processing temperature to a second regeneration processing temperature in the exemplary embodiment.

As shown in FIG. 13, the judgment on whether or not the differential pressure abnormality is eliminated is made with reference to a detection of a time point t3 at which, after the abrupt increase in the differential-based deposition amount PMa (the time point t2), the differential-based deposition amount PMa becomes lower than the predetermined threshold PMth and the differential-based deposition amount PMa becomes lower than the PM deposition amount PMs. It should be noted that, though the time point t2 at which the differential-based deposition amount PMa abruptly increases may be defined to be the same as the time point t1 in FIG. 12, when a threshold PMth1 for the differential pressure at the start of the regeneration processing is defined, the time point t2 is defined at the time point at the start of the regeneration processing.

When it is judged that the differential pressure abnormality is not eliminated (S11: No), the regeneration temperature setting unit 30 continues the regeneration processing at the first regeneration processing temperature.

When it is judged that the differential pressure abnormality is eliminated (S11: Yes), the regeneration temperature setting unit 30 sets the second regeneration processing temperature to which the regeneration processing temperature is changed (Step S12) and the regeneration commander 12 commands the engine controller 10 to perform the regeneration at the second regeneration processing temperature (Step S13).

The regeneration controller 11 judges whether or not the sequentially calculated PM deposition amount PMs falls at or below a predetermined value (Step S14). When it is judged that the PM deposition amount PMs has not fallen at or below the predetermined value (S14: No), the regeneration temperature setting unit 30 continues the regeneration processing at the second regeneration processing temperature.

When the PM deposition amount PMs falls at or below the predetermined value, the regeneration controller 11 terminates the regeneration processing (Step S15).

Consequently, as shown in FIG. 6, the regeneration controller 11 performs the regeneration processing at the first regeneration processing temperature until the cell clogging is eliminated and, when it is judged that the cell clogging has been eliminated, the regeneration controller 11 performs the regeneration processing at the second regeneration processing temperature, thereby combusting all of PM deposited in the DPF 22.

Further, since regeneration processing at the (lower) first regeneration processing temperature is performed until the cell clogging is eliminated, an abrupt temperature increase due to combustion of the portion with highly dense PM on account of the cell clogging can be avoided, so that melting of the cell of the DPF 22 can be prevented.

6. Modifications of Exemplary Embodiment(s)

Incidentally, it should be understood that the scope of the present invention is not limited to the above-described exemplary embodiment(s) but includes modifications and improvements as long as the modifications and improvements are compatible with the invention.

Though the model deposition amount PMb is calculated by subtracting the PM combustion amount combusted in the DPF from the PM generation amount generated in the diesel engine 1 in the exemplary embodiment, the model deposition amount PMb may be calculated in a different manner. In other words, the model deposition amount may be calculated based on a model of the PM deposition amount using other methods.

Though it is judged that the cell clogging has been eliminated when the differential-based deposition amount PMa falls at or below the predetermined threshold PMth and less than the PM deposition amount PMs in the above exemplary embodiment, the elimination of the cell clogging may be judged based solely on the judgment on whether or not the differential-based deposition amount PMa falls at or below the predetermined threshold.

Though it is judged in the above exemplary embodiment based on the differential-based deposition amount PMa that the cell clogging has been eliminated, the elimination of the cell clogging may be judged when the differential pressure per se falls at or below the predetermined threshold.

Other specific structures and configurations in the invention may be altered as desired as long as the alteration is compatible with the invention.

The invention claimed is:

1. An exhaust gas purifying system comprising:
    a filter configured to collect particulate matters (PM) in exhaust gas from an engine;
    a differential pressure detector configured to detect a differential pressure between an inlet and outlet of the filter;
    a flow rate detector configured to detect a flow rate of the exhaust gas flowing in the filter;
    a regeneration controller configured to calculate a differential-based deposition amount of the particulate matters deposited in the filter based on detection results of the differential pressure detector and the flow rate detector, configured to calculate a model deposition amount using a deposition model of the particulate matters when a time change rate of the calculated differential-based deposition amount is larger than a predetermined value, configured to calculate a PM-deposition amount based on the calculated differential-based deposition amount and the calculated model deposition amount, and configured to set a regeneration processing temperature of the filter based on the calculated differential-based deposition amount of the particulate matters; and
    an engine controller configured to perform a regeneration processing of the filter based on the regeneration processing temperature that is set by the regeneration controller, wherein
    the regeneration controller is configured to:
    based on the calculated differential-based deposition amount of the particulate matters being greater than a predetermined threshold, set a first regeneration processing temperature at a start of the regeneration processing, and change the regeneration processing temperature to a second regeneration processing temperature that is higher than the first regeneration processing temperature when the calculated differential-based deposition amount of the particulate matters falls at or below the predetermined threshold.

2. The exhaust gas purifying system according to claim 1, wherein
    the regeneration controller is configured to set the second regeneration processing temperature when the calculated differential-based deposition amount falls below the calculated PM-deposition amount.

3. The exhaust gas purifying system according to claim 2, wherein
    the deposition model is a model in which the PM amount combusted in the filter is subtracted from the PM amount in the exhaust gas inputted to the filter, and
    the regeneration controller is configured to multiply the calculated differential-based deposition amount with a first coefficient to obtain a first deposition amount and multiply the calculate model deposition amount with a second coefficient to obtain a second deposition amount, a sum of the first and second coefficients being a predetermined value, and to calculate the PM-deposition amount as a sum of the first deposition amount and the second deposition amount.

4. The exhaust gas purifying system according to claim 1, wherein the regeneration controller is configured to change the regeneration processing temperature from the first regeneration processing temperature to the second regeneration processing temperature over a predetermined time.

5. An exhaust gas purifying system comprising:
    a filter configured to collect particulate matters (PM) in exhaust gas from an engine;
    a differential pressure detector configured to detect a differential pressure between an inlet and outlet of the filter;
    a flow rate detector configured to detect a flow rate of the exhaust gas flowing in the filter;
    a regeneration controller configured to calculate a differential-based deposition amount of the particulate matters deposited in the filter based on detection results of the differential pressure detector and the flow rate detector, configured to calculate a model deposition amount using a deposition model of the particulate matters when a time change rate of the calculated differential-based deposition amount is larger than a predetermined value,
    configured to calculate a PM-deposition amount based on the calculated differential-based deposition amount and the calculated model deposition amount, and
    configured to set a regeneration processing temperature of the filter based on the calculated differential-based deposition amount of the particulate matters; and
    an engine controller configured to perform a regeneration processing of the filter based on the regeneration processing temperature that is set by the regeneration controller, wherein
    the regeneration controller is configured to set a first regeneration processing temperature at a start of the regeneration processing and to set a second regeneration processing temperature that is higher than the first regeneration processing temperature when the calculated PM-deposition amount falls at or below a predetermined threshold.

6. The exhaust gas purifying system according to claim 5, wherein
    the regeneration controller sets the second regeneration processing temperature when the calculated differential-based deposition amount falls below the calculated PM-deposition amount.

7. The exhaust gas purifying system according to claim 6, wherein
    the deposition model is a model in which the PM amount combusted in the filter is subtracted from the PM amount in the exhaust gas inputted to the filter, and
    the regeneration controller is configured to multiply the calculated differential-based deposition amount with a first coefficient to obtain a first deposition amount and multiply the calculated model deposition amount with a second coefficient to obtain a second deposition amount, a sum of the first and second coefficients being a predetermined value, and to calculate the PM-deposition amount as a sum of the first deposition amount and the second deposition amount.

8. The exhaust gas purifying system according to claim 5, wherein the regeneration controller is configured to change the regeneration processing temperature from the first regeneration processing temperature to the second regeneration processing temperature over a predetermined time.

* * * * *